Patented Apr. 17, 1923.

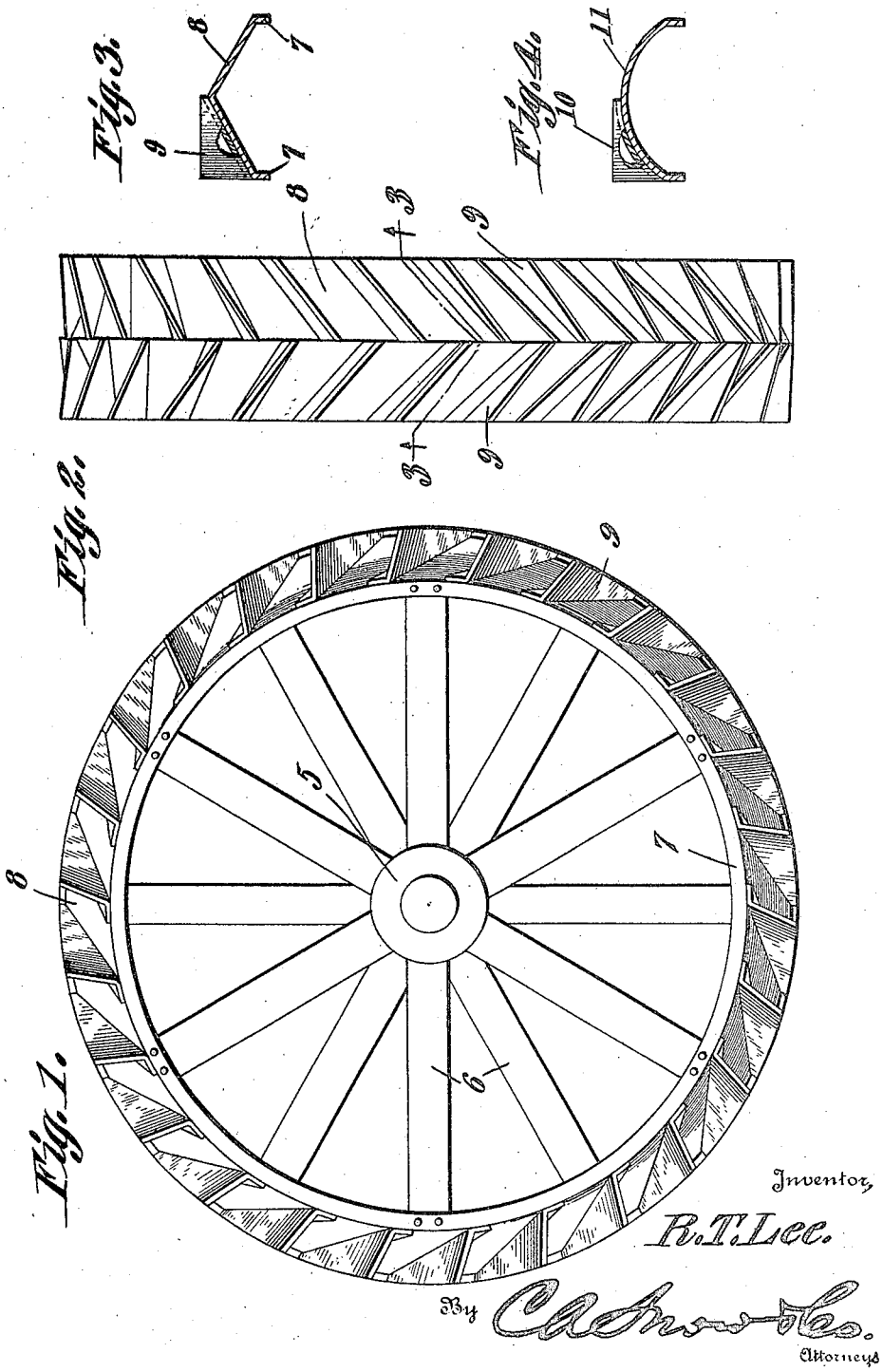

1,451,991

UNITED STATES PATENT OFFICE.

RALSTON T. LEE, OF MARIETTA, OHIO.

DRIVE-WHEEL RIM.

Application filed February 14, 1922. Serial No. 536,475.

*To all whom it may concern:*

Be it known that I, RALSTON T. LEE, a citizen of the United States, residing at Marietta, in the county of Washington and State of Ohio, have invented a new and useful Drive-Wheel Rim, of which the following is a specification.

This invention relates to wheel constructions, and more particularly to a wheel especially adapted for use on tractors or the like.

The primary object of the invention is to provide a wheel having a novel form of tread, whereby mud or soft earth will be forced laterally between the cleats which are carried on the rim.

Another object of the invention is to arrange the cleats in a manner to increase traction.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of a wheel constructed in accordance with the present invention.

Figure 2 is a front elevational view thereof.

Figure 3 is a sectional view taken on line 3—3 of Figure 2.

Figure 4 is a sectional view through a modified form of the invention.

Referring to the drawing in detail, the hub of the wheel is indicated at 5, from which radiate spokes 6, that have their outer ends connected to the inwardly extended flanges 7 of the rim 8.

The rim or rim 8 is formed with inclined surfaces as clearly shown by Figure 3 of the drawings, so that mud or soft earth over which the wheel is moving, will be forced over the inclined surfaces and have an unobstructed passage laterally of the rim.

Secured to the inclined surfaces of the rim 8, in any suitable manner, are the cleats 9 which are relatively wide at their outer ends, the inner ends thereof being relatively narrow to present a comparatively even surface. In the modified form of the invention as shown by Figure 4 of the drawing, the rim is formed with a curved surface adapting the device for use in connection with pneumatic tires of motor vehicles, it being obvious that by positioning a rim of this construction over a deflated pneumatic tire, that the rim will be secured to the tire, upon inflation thereof.

The cleats which are indicated at 10 are formed with curved surfaces contacting with the curved rim 11, the cleats being arranged in staggered relation with respect to each other, in a manner as indicated by Figure 2 of the drawing. From the foregoing it is obvious that as a wheel, constructed in accordance with the present invention moves over mud, the mud which will be picked up between the cleats upon continuous rotation, will be forced from the rim of the wheel over the inclined surfaces between the cleats, to the end that the mud will not clog the wheel to reduce the traction qualities thereof.

Having thus described the invention, what is claimed as new is:—

In a wheel construction, a hub, spokes radiating from the hub, a rim curved transversely to provide inclined surfaces, cleats having right angled flanges and disposed at angles with respect to the side edges of the rim, said cleats having their upper edges disposed in transverse planes above the apex of the rim.

In testimony that I claim the foregoing as my own, I have hereto affixed my signature in the presence of two witnesses.

RALSTON T. LEE.

Witnesses:
HARRIETTE HOLLISTER,
LAURA D. HOLLISTER.